United States Patent Office 3,613,343
Patented Oct. 19, 1971

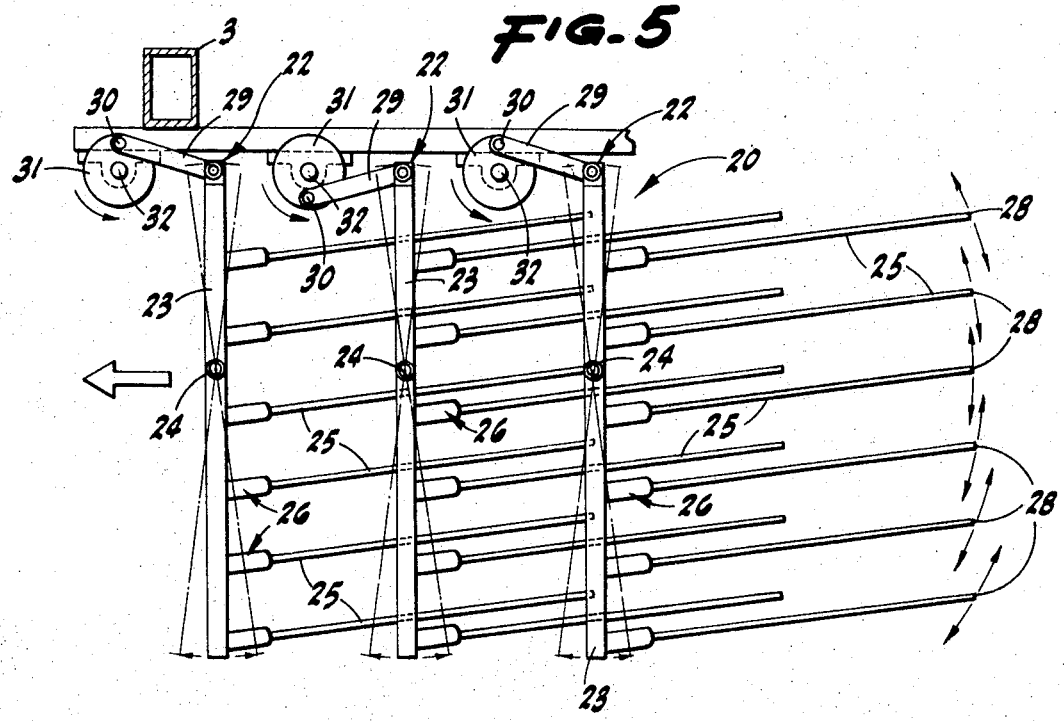
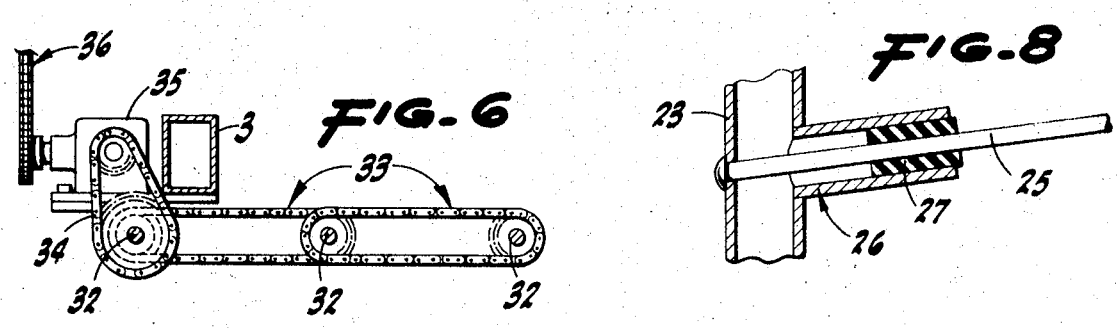
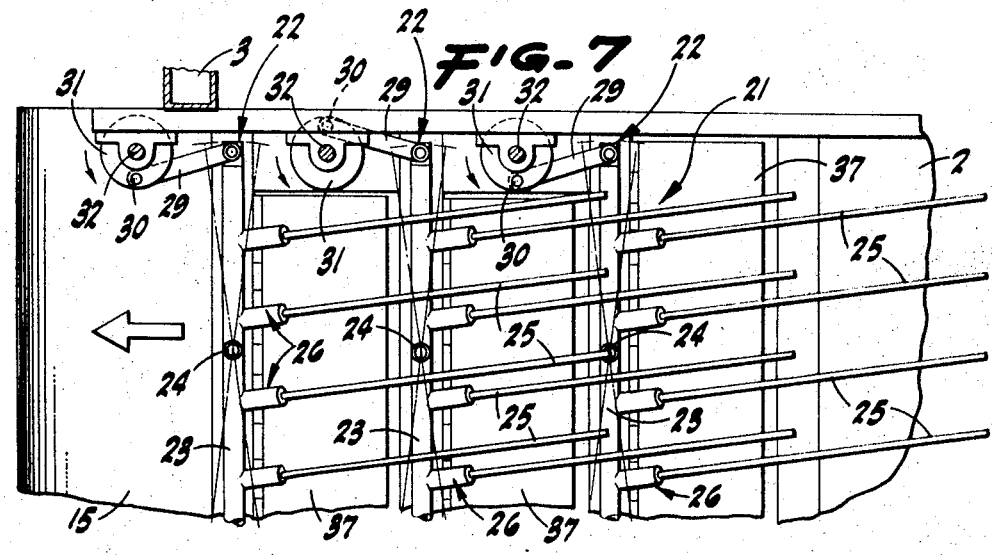

3,613,343
GRAPE HARVESTER
Jean Sagouspe and Eugene D. Riley, Los Banos, Calif., assignors to Genie Grape Harvester, Inc., Los Banos, Calif.
Filed Apr. 21, 1969, Ser. No. 817,863
Int. Cl. A01g 19/60
U.S. Cl. 56—330
6 Claims

ABSTRACT OF THE DISCLOSURE

A grape harvester, for mechanically harvesting grapes from a row of vines trained on a post-supported above-ground wire, comprising a self-propelled mobile frame adapted to straddle and advance along the row of vines; the mobile frame being fitted with a power driven mechanism arranged to engage and shake the vines whereby to cause detachment of the grapes upon such advance of said frame, and the latter having thereon a detached-grape catching and conveying system.

SUMMARY OF THE INVENTION

The present invention provides, as a major object, a grape harvester which includes—on a self-propelled mobile frame adapted to straddle and advance along a row of vines trained on a post-supported aboveground wire—a novel power-driven mechanism arranged to engage and shake the vines whereby to cause detachment of the grapes therefrom upon such advance of said mobile frame; the latter having a detached-grape catching and conveying system thereon.

The present invention provides, as an additional object, a grape harvester, as above, wherein the power-driven vine-engaging and shaking mechanism includes—on each side of the mobile frame—a bank of separate, longitudinally spaced, vine-engaging shaker units; the transversely spaced, corresponding shaker units, of said banks thereof, providing pairs which work into the vines from opposite sides thereof.

The present invention provides, as another object, a grape harvester, as in the preceding paragraph, wherein—in the power-driven cycling of said mechanism—certain of the separate shaker units operate out of phase relative to the others; this operational characteristic greatly enhancing the detachment of the grapes from the vines being shaken.

The present invention provides, as still another object, a grape harvester wherein each shaker unit includes an upstanding rocker bar transversely pivoted on the mobile frame for powered rocking motion in a longitudinal vertical plan laterally outwardly of the corresponding side of the row of vines; there being a multiplicity of relatively long, vertically spaced spring rods fixed at one end on such rocker bar and thence extending rearwardly at an inward diagonal to, and for shaking engagement with, the vines of said row.

The present invention provides, as a further object, a grape harvester which is designed for ease and economy of manufacture.

The present invention provides, as a still further object, a practical, reliable, and durable grape harvester and one which is exceedingly effective for the purpose for which it is designed.

BRIEF DESCRIPTION OF THE DRAWINGS

FIG. 5 is a fragmentary, longitudinal elevation, substantially on line 5—5 of FIG. 2, showing the bank of shaker units on one side of the harvester.

FIG. 6 is a fragmentary, longitudinal sectional elevation, substantially on line 6—6 of FIG. 2, showing the drive for the shaker units.

FIG. 7 is a fragmentary, longitudinal elevation, with sectional parts of the view taken substantially on line 7—7 of FIG. 2, showing the bank of shaker units on the side opposite the bank shown in FIG. 5.

FIG. 8 is a fragmentary sectional elevation, substantially on line 8—8 of FIG. 3, showing the connection between each shaker rod and the related rocker post.

DESCRIPTION OF THE PREFERRED EMBODIMENT

Figure 1:
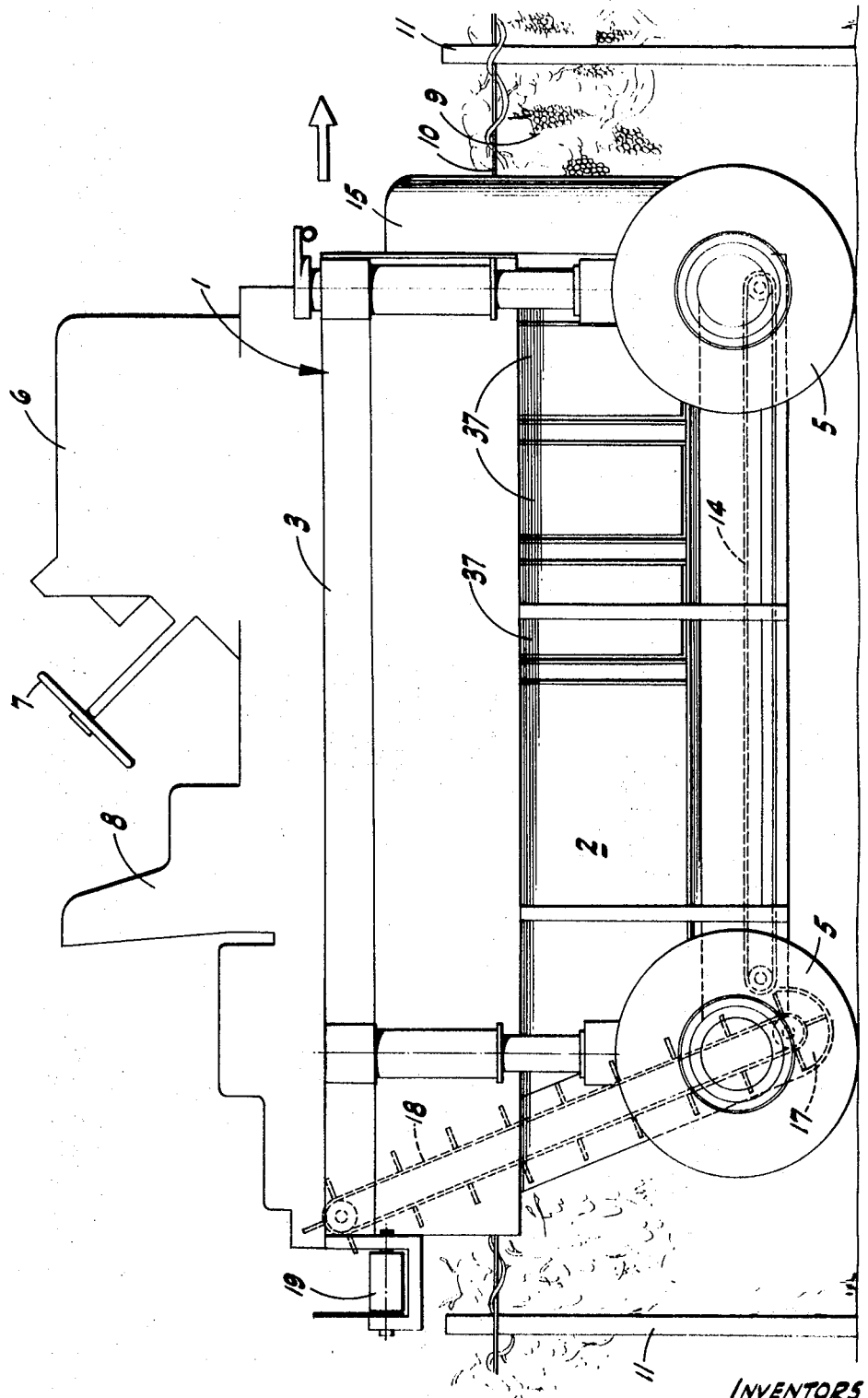
FIG. 1 is a somewhat diagrammatic side elevation of the grape harvester embodying the present invention; the harvester being shown as straddling and advancing along a row of grape vines to remove the grapes therefrom.
Figure 2:
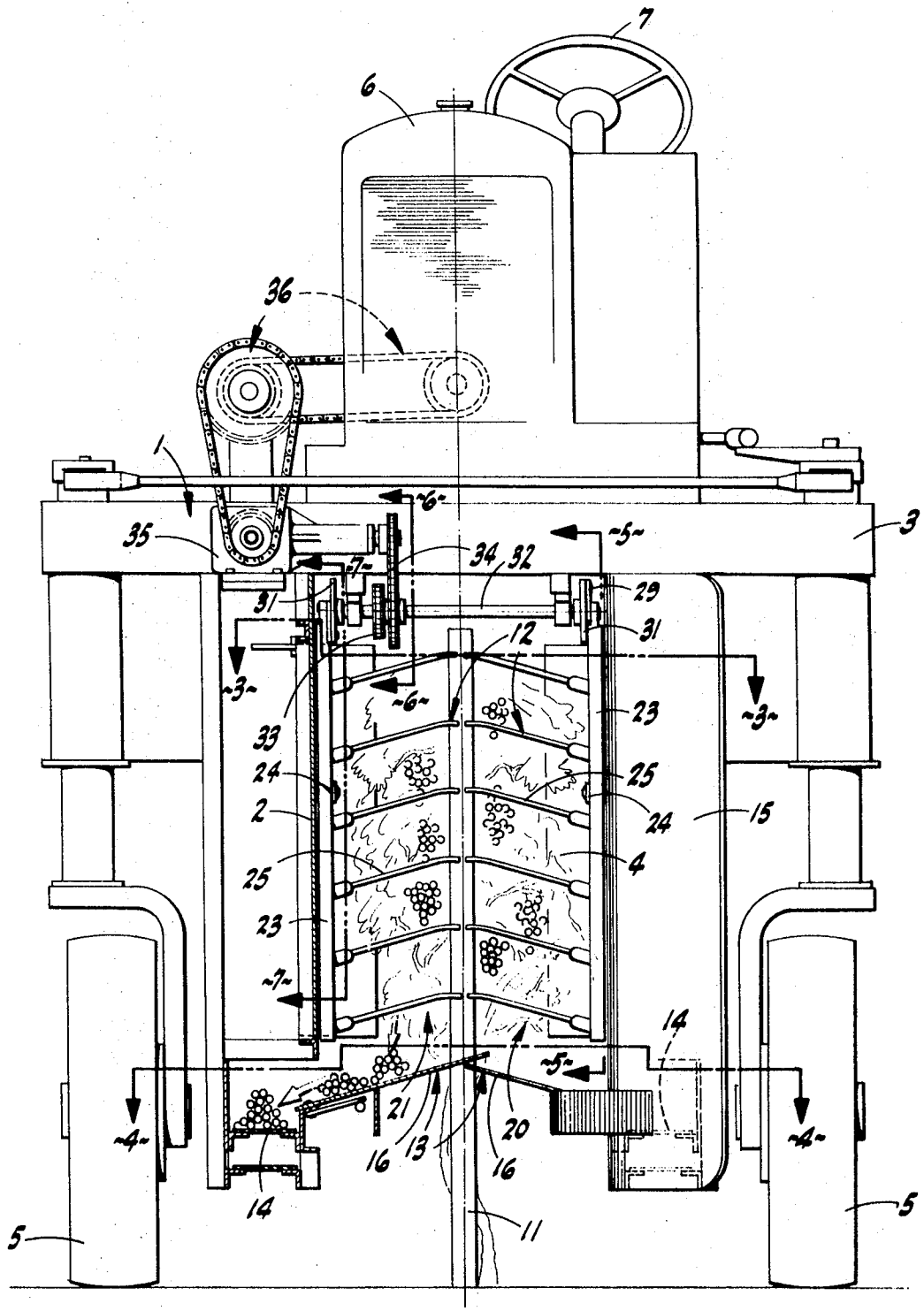
FIG. 2 is a front end elevation of the harvester as in FIG. 1; the view being partly broken away and partly in section.

Referring now more particularly to the drawings and to the characters of reference marked thereon, the present invention is embodied in a self-propelled vehicle which includes a mobile frame, indicated generally at 1, of inverted U shape whereby—between transversely spaced sides 2 and the top 3 of said frame—a longitudinal, open-ended tunnel 4 is formed. The frame 1 is supported by wheels 5, certain of which are driven and certain of which are steerable—both in substantially conventional fashion. The engine is shown at 6, while the steering wheel and operator's seat appear at 7 and 8, respectively.

When the harvester is in operation, it advances in straddling relation to a row of grape vines 9 trained on an aboveground wire 10 attached to and supported by longitudinally spaced posts 11; such row of vines passing—in relatively movable relation—through the open-ended tunnel 4 of frame 1. With such advance of the harvester, and within the confines of tunnel 4, the grapes are detached from the vines 9 by means of a novel power-driven vine-engaging and shaking mechanism indicated generally at 12; such mechanism, which embodies the essential concept of the present invention, being hereinafter described in detail.

Upon detachment from the vines 9, the grapes fall upon a longitudinal catch floor, indicated generally at 13, defining the bottom of tunnel 4; such floor 13 sloping laterally downward from the center so that the detached grapes (as received on the floor) gravitate onto longitudinal, rearwardly traveling conveyors 14 disposed at the sides of such floor rearwardly of laterally outwardly curved vine deflectors 15 at the front ends of sides 2.

Figure 4:
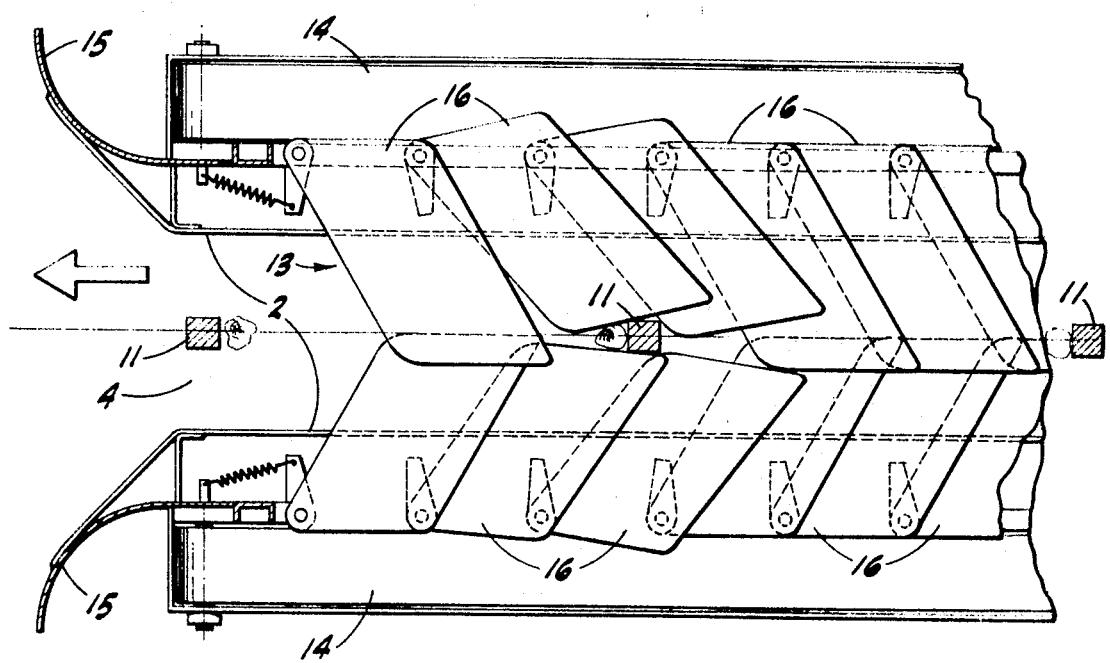
FIG. 4 is a fragmentary sectional plan view, substantially on line 4—4 of FIG. 2, showing the swinging-plate type, detached-grape catching floor and associated conveyors.

The catch floor 13 is comprised, in each lengthwise half thereof, of a row of pivotally mounted, rearwardly yieldable but normally forwardly spring-urged floor plates 16; the floor plates of each row always being at a rearward and inward diagonal. The plates 16 of each row partially lap adjacent plates, while the rows are lapped along the longitudinal center line of said catch floor 13; all as shown in FIG. 4. With the catch floor 13 so constructed, the posts 11 and the trunks of the vines 9 can relatively pass through said floor lengthwise thereof; this for the reason that corresponding floor plates of the rows yield, with a rearwardly and outwardly pivotal movement, when engaged by said posts and vine trunks. Thus, as the harvester advances, the vines 9 are progressively received in the tunnel 4 without hindrance by or damage to the posts and vine trunks, yet with the catch floor 13 remaining at all times in substantially closed or unbroken condition.

The detached-grape catching and conveying system includes—in addition to the catch floor 13 and the longitudinal side conveyors 14—a rear cross conveyor 17 which feeds from the rear end of one side conveyor 14 to the other, and an elevator conveyor 18 which receives the total feed and thence delivers the same to a top cross conveyor 19 arranged to discharge into a bin truck (not shown) traveling alongside the harvester.

The power-driven vine-engaging and shaking mechanism 12 comprises, on each side of the mobile frame 1, i.e. in each longitudinal half of the tunnel 4, a bank of separate, longitudinally spaced, vine-engaging shaker units; such opposed banks of such shaker units being indicated generally at 20 and 21, respectively. Each of the banks 20 and 21 includes three shaker units in longitudinally spaced array, and each such shaker unit is indicated generally at 22.

As the individual shaker units 22 of both banks are essentially of like construction, the following description of the structure of one such shaker unit will suffice for all.

Each such shaker unit 22 comprises an upright rocker post 23 disposed relatively close to the related side 2 of the mobile frame 1; such post being pivoted, as at 24, intermediate of its ends for oscillatory rocking in a longitudinal vertical plane.

A plurality of elongated spring rods 25 are fixed on the post 23 in evenly vertically spaced parallel relation and each by means of the tubular connection 26 shown in detail in FIG. 8; said connection including a rubber, shock-absorbing bushing 27 surrounding the rod adjacent its inner end.

Figure 3:
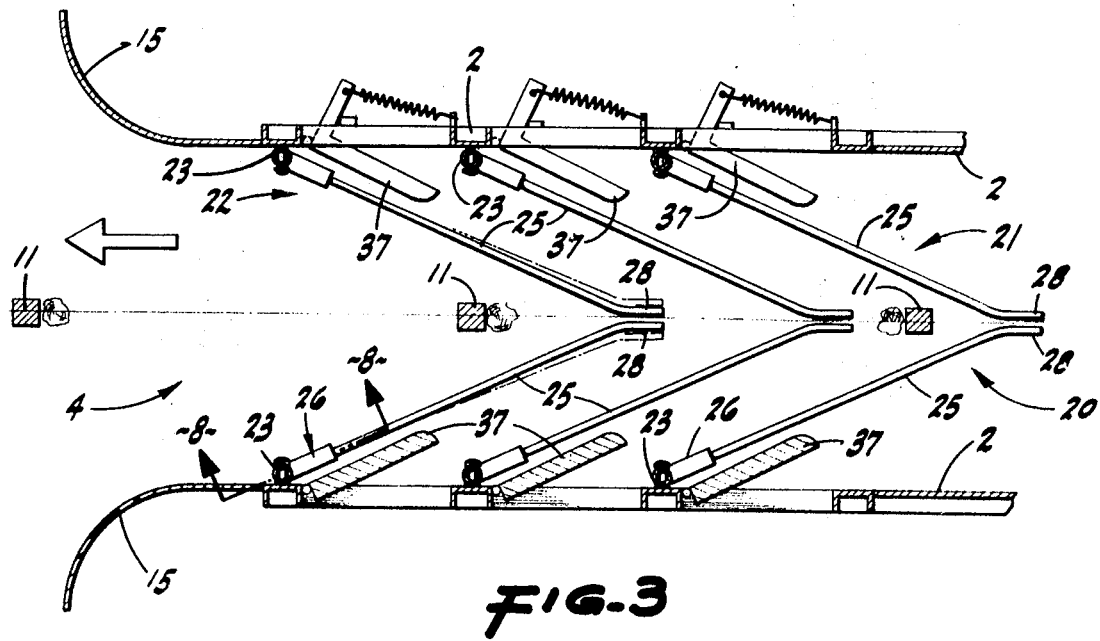
FIG. 3 is a fragmentary sectional plan view, substantially on line 3—3 of FIG. 2, showing the array of shaker units which comprise the power-driven vine-engaging and shaking mechanism of the harvester.

The spring rods 25 extend in parallel at a rearward and inward diagonal from the rocker post 23; the free or rear ends of such rods terminating—at substantially the longitudinal center line of the tunnel 4—in a short finger 28 bent to project rearwardly parallel to and substantially at said center line (see FIG. 3). As the opposed shaker units of the banks 20 and 21 thereof are—as shown—in alinement transversely of the mobile frame 1, the rods 25 and fingers 28 thereof are symmetrically disposed when viewed in plan.

A short link 29 is pivotally connected to the upper end of each rocker post 23 and thence extends in a generally forward direction to pivotal connection with the crank pin 30 of a crank disc 31 secured on a driven cross shaft 32 journaled in the upper portion of frame 1 and transversely spanning the tunnel 4 at the top thereof.

The crank discs 31 of the transversely opposed shaker units 22 are fixed on the same cross shaft 32, and all of such cross shafts 32 are connected together—for intime rotation—by means of endless chain and sprocket assemblies 33. Such rotation is provided by an endless drive 34 which runs between a reduction gear box 35 and one of the cross shafts 32; the gear box 35 being driven from the engine 6 by suitable drive means here indicated generally at 36. With the foregoing drive system, all of the shaker units 22 are simultaneously actuated; rotation of the cross shafts 32 and crank discs 31 producing, by means of the links 29, a back-and-forth swinging motion or oscillation of the rocker posts 23 about the pivots 24 as an axis.

Thus, as the harvester advances in straddling relation to a row of the wire-supported vines 9, the rearwardly and inwardly diagonaled spring rods 25 of each shaker unit sweep up and down in and through such vines causing detachment of the bunches of grapes, whence the same drop onto the catch floor 13 and are thereafter conveyed to a point of discharge as previously described. As the rods 25 are of spring nature, they do not damage the vines, and also such rods deflect easily in order to pass the posts 11 and the vine trunks without difficulty.

In order to enhance the shaking action on the vines by the spring rods 25, the intermediate shaker unit 22 of each of the banks 20 and 21 runs out-of-phase relative to the other two shaker units of the respective bank. This is accomplished in the manner shown in FIGS. 5 and 7 wherein it will be observed that the crank pin 30 of the intermediate shaker unit of each bank is set 180 degrees from the crank pins of the other two shaker units. Hence, while the spring rods 25 of each intermediate shaker unit 22 are moving up or down, the spring rods of the other two shaker units of the same bank are moving in the opposite direction.

It will also be observed—by comparing FIGS. 5 and 7—that the crank discs 31 corresponding to the opposed shaker units 22 in the banks 20 and 21 thereof are disposed so that the crank pins 30 of said crank discs run 180 degrees apart. Thus, such opposed shaker units 22 work out-of-phase relative to each other; i.e. the spring rods 25 of one of the opposed shaker units 22 moving up or down while the spring rods of the other shaker unit are moving in reverse.

With the described out-of-phase action of the intermediate shaker unit 22 of each of the banks 20 and 21, and the out-of-phase action of each set of opposed shaker units 22, an enhanced and most effective shaking action on, and thrashing of, the vines 9 is obtained as the harvester advances.

To further assure of maximum detachment of the bunches of grapes from the vines, the sides 2 of the frame 1 are each provided with a bank of vertically disposed, spring-urged deflector plates 37 (in the form of doors) corresponding to the banks 20 and 21 of shaker units 22; there being one such deflector plate 37 immediately rearwardly of each shaker unit. The deflector plates (which may be suitably adjustably mounted) normally occupy a position at a rearward and inward diagonal relatively close to the plane of movement of the rods 25 of the related shaker unit 22. The deflector plates 37 serve the purpose of bunching the vines 9 toward the wire 10 and as desired for the most effective action of the shaker units.

From the foregoing description, it will be readily seen that there has been produced such a grape harvester as substantially fulfills the objects of the invention, as set forth herein.

We claim:

1. In a grape harvester, for mechanically harvesting grapes from a row of vines trained on a post-supported aboveground wire, which embodies a mobile frame adapted to straddle and advance along the row of vines, a power-driven mechanism on the mobile frame arranged to engage and shape the vines whereby to cause detachment of the grapes therefrom upon advance of the mobile frame, and a detached-grape catching and conveying system on said mobile frame; the improvement characterized by said mechanism including a plurality of vine-engaging shaker units frame-mounted laterally outwardly of and on opposite sides of the row of vines, and each shaker unit comprising an upstanding vertically elongated rocker bar transversely pivotally mounted for swinging motion in a plane extending in the direction of advance of the mobile frame, the axis of said pivotal mount being disposed intermediate and a substantial distance from the ends of the rocker bar, and a plurality of vertically spaced elongated shaker rods secured to the rocker bar and extending therefrom in rearwardly and permanently inwardly converging relation to the row of vines and to free-end terminations constantly closely adjacent the longitudinal vertical plane occupied by the wire.

2. In a grape harvester, for mechanically harvesting grapes from a row of vines trained on a post-supported aboveground wire, which embodies a mobile frame adapted to straddle and advance along the row of vines, a power-driven mechanism on the mobile frame arranged to engage and shake the vines whereby to cause detachment of the grapes therefrom upon advance of the mobile frame, and a detached-grape catching and conveying system on said mobile frame; the improvement characterized by said mechanism including a plurality of vine-engaging shaker units frame-mounted laterally outwardly of the row of vines, and each shaker unit comprising a swingable member having a plurality of spaced shaker rods secured thereon and extending laterally inwardly to a point for shaking arrangement with the vines upon swinging of such member; the shaker units being disposed on opposite sides of the row of vines, and the swingable member of each such shaker unit being an upstanding rocker bar pivotally mounted for swinging in a plane extending generally in the direction of advance of the mobile frame, and the shaker rods extending from the rocker bar in vertically spaced relation, and in rearwardly and inwardly converging relation to the row of vines; the shaker rods being stiff but flexible and resilient, the shaker units on opposite sides of the row of vines being substantially in transverse alinement, and the trailing ends of the converging rods of said opposed shaker units terminating in closely adjacent longitudinal vertical planes.

3. A grape harvester, as in claim 2, in which said trailing ends of the converging rods of the opposed shaker units are formed with relatively short, rearwardly projecting fingers; said fingers being disposed in adjacent longitudinal vertical planes.

4. In a grape harvester, for mechanically harvesting grapes from a row of vines trained on a post-supported aboveground wire, which embodies a mobile frame adapted to straddle and advance along the row of vines, a power-driven mechanism on the mobile frame arranged to engage and shake the vines whereby to cause detachment of the grapes therefrom upon advance of the mobile frame, and a detached-grape catching and conveying system on said mobile frame; the improvement characterized by said mechanism including a plurality of vine-engaging shaker units frame-mounted laterally outwardly of the row of vines, and each shaker unit comprising a swingable member having a plurality of spaced shaker rods secured thereon and extending laterally inwardly to a point for shaking engagement with the vines upon swinging of such member; there being a bank of said shaker units disposed on opposite sides of the row of vines upon advance of the mobile frame in straddling relation thereto; the swingable member of each shaker unit being an upstanding rocker bar pivoted intermediate its ends for oscillation in a longitudinal vertical plane, power means to simultaneously oscillate the rocker bars, and the shaker rods being vertically spaced, elongated, and extending from the rocker bar in rearwardly and permanently inwardly converging relation to the row of vines.

5. In a grape harvester, for mechanically harvesting grapes from a row of vines trained on a post-supported aboveground wire, which embodies a mobile frame adapted to straddle and advance along the row of vines, a power-driven mechanism on the mobile frame arranged to engage and shake the vines whereby to cause detachment of the grapes therefrom upon advance of the mobile frame, and a detached-grape catching and conveying system on said mobile frame; the improvement characterized by said mechanism including a plurality of vine-engaging shaker units frame-mounted laterally outwardly of the row of vines, and each shaker unit comprising a swingable member having a plurality of spaced shaker rods secured thereon and extending laterally inwardly to a point for shaking engagement with the vines upon swinging of such member; there being a bank of said shaker units disposed on opposite sides of the row of vines upon advance of the mobile frame in straddling relation thereto, the swingable member of each such shaker unit being an upstanding rocker bar pivoted intermediate its ends for oscillation in a longitudinal vertical plane, power means to simultaneously oscillate the rocker bars, and the shaker rods being vertically spaced and extending from the rocker bar in rearwardly and inwardly converging relation to the row of vines; the shaker units being disposed in pairs, with the shaker units of each pair on opposite sides of the row of vines and in substantially transverse alinement, and the trailing ends of the converging rods of each pair of shaker units terminating closely adjacent each other.

6. In a grape harvester, for mechanically harvesting grapes from a row of vines trained on a post-supported aboveground wire, which embodies a mobile frame adapted to straddle and advance along the row of vines, a power-driven mechanism on the mobile frame arranged to engage and shake the vines whereby to cause detachment of the grapes therefrom upon advance of the mobile frame, and a detached-grape catching and conveying system on said mobile frame; the improvement characterized by said mechanism including a plurality of vine-engaging shaker units frame-mounted laterally outwardly of the row of vines, and each shaker unit comprising a swingable member having a plurality of spaced shaker rods secured thereon and extending laterally inwardly to a point for shaking engagement with the vines upon swinging of such member; there being a bank of longitudinally spaced shaker units disposed on opposite sides of the row of vines, corresponding shaker units of the banks thereof being substantially transversely alined and arranged to operate out-of-phase, and at least one of the shaker units of each bank being arranged to operate out-of-phase relative to the others of said bank.

References Cited
UNITED STATES PATENTS 3,184,908   5/1965   Rust _____ 56—330

ROBERT PESHOCK, Primary Examiner